(12) United States Patent
Lavoie et al.

(10) Patent No.: US 10,747,218 B2
(45) Date of Patent: Aug. 18, 2020

(54) MOBILE DEVICE TETHERING FOR REMOTE PARKING ASSIST

(71) Applicant: Ford Global Technologies, LLC, Dearborn, MI (US)

(72) Inventors: Erick Michael Lavoie, Dearborn, MI (US); Alyssa Chatten, Royal Oak, MI (US); John Robert Van Wiemeersch, Novi, MI (US); Hamid M. Golgiri, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 393 days.

(21) Appl. No.: 15/870,096

(22) Filed: Jan. 12, 2018

(65) Prior Publication Data
US 2019/0220001 A1    Jul. 18, 2019

(51) Int. Cl.
| | | |
|---|---|---|
| *G05D 1/00* | (2006.01) | |
| *H04N 5/247* | (2006.01) | |
| *B60W 30/06* | (2006.01) | |
| *G08G 1/16* | (2006.01) | |
| *H04N 5/232* | (2006.01) | |

(52) U.S. Cl.
CPC ......... *G05D 1/0038* (2013.01); *B60W 30/06* (2013.01); *G05D 1/005* (2013.01); *G08G 1/168* (2013.01); *H04N 5/247* (2013.01); *G05D 2201/0213* (2013.01); *H04N 5/23238* (2013.01)

(58) Field of Classification Search
None
See application file for complete search history.

(56) References Cited

U.S. PATENT DOCUMENTS

| | | |
|---|---|---|
| 5,959,724 A | 9/1999 | Izumi |
| 6,151,539 A * | 11/2000 | Bergholz ............... G01S 17/89 701/25 |
| 6,275,754 B1 | 8/2001 | Shimizu |
| 6,356,828 B1 | 3/2002 | Shimizu |
| 6,452,617 B1 | 9/2002 | Bates |
| 6,476,730 B2 | 11/2002 | Kakinami |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Richard M Camby
(74) *Attorney, Agent, or Firm* — Frank Lollo; Eversheds Sutherland (US) LLP

(57) ABSTRACT

Method and apparatus are disclosed for mobile device tethering for remote parking assist. An example vehicle includes ultra-wide angle cameras and a processor coupled to memory. The processor generates an interface based on a location of the mobile device including an overhead representation of the vehicle generated using images from the cameras and representations of a position of a mobile device and a boundary around the vehicle. The processor also sends the interface to the mobile device, and when the mobile device is not within the boundary, prevents autonomous parking of the vehicle.

20 Claims, 6 Drawing Sheets

(56) References Cited

U.S. PATENT DOCUMENTS

| | | |
|---|---|---|
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall et al. |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb et al. |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty et al. |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 10,369,988 B2 * | 8/2019 | Tseng ............... G05D 1/0212 |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |

(56) References Cited

U.S. PATENT DOCUMENTS

| | | |
|---|---|---|
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0045991 A1 | 2/2015 | Schwitters et al. |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |

(56) References Cited

U.S. PATENT DOCUMENTS

| | | |
|---|---|---|
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009051055 A1 | 7/2010 |
| DE | 102016224529 A1 | 3/2011 |
| DE | 102016226008 A1 | 3/2011 |
| DE | 102010034129 B4 | 11/2012 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2010/006981 A1 | 1/2010 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2011/141096 A1 | 7/2014 |
| WO | WO 2013/056959 A1 | 5/2015 |
| WO | WO 2013/123813 A1 | 12/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/096728 A1 | 7/2017 |
| WO | WO 2017/097942 A1 | 7/2017 |

OTHER PUBLICATIONS

Bill Howard, Bosch's View of the Future Car: Truly Keyless Entry, Haptic Feedback, Smart Parking, Cybersecurity, Jan. 9, 2017, 8 Pages.

Alberto Broggi and Elena Cardarelli, Vehicle Detection for Autonomous Parking Using a Soft-Cascade ADA Boost Classifier, Jun. 8, 2014.

(56) References Cited

OTHER PUBLICATIONS

Al-Sherbaz, Ali et al., Hybridisation of GNSS with other wireless/sensors technologies on board smartphones to offer seamless outdoors-indoors positioning for LBS applications, Apr. 2016, 3 pages.
Automatically Into the Parking Space—https://www.mercedes-benz.com/en/mercedes- benz/next/automation/automatically-into-the-parking-space/; Oct. 27, 2014.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
DAIMLER AG, Remote Parking Pilot, Mar. 2016 (3 Pages).
Jingbin Liu, IParking: An Intelligent Indoor Location-Based Smartphone Parking Service, Oct. 31, 2012, 15 pages.
Land Rover develops a smartphone remote control for its SUVs, James Vincent, Jun. 18, 2015.
Land Rover, Land Rover Remote Control via Iphone RC Range Rover Sport Showcase—Autogeföhl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.

* cited by examiner

# MOBILE DEVICE TETHERING FOR REMOTE PARKING ASSIST

TECHNICAL FIELD

The present disclosure generally relates to a remote assist park system in a vehicle and, more specifically, mobile device tethering for remote parking assist.

BACKGROUND

A remote parking assist (RePA) system is designed to autonomously park a vehicle provided that the user's remote device is within a specified distance of the vehicle. The RePA system is intended to used when the operator is outside the vehicle. The operator triggers the RePA system to park or un-park a vehicle into or out of a parking space using a remote device wirelessly communicating with the vehicle. Governments are developing regulations to require that control of RePA with the remote device shall only be allowed when the remote device is within a certain distance of the vehicle. For example, the proposed European regulation requires the remote device to be within 6 meters of the nearest point of the motor vehicle (see Economic Commission for Europe, Regulation No. 79) in order for the vehicle to autonomously park. As a result of these regulations, the operator may need to move as the vehicle moves when the path the vehicle is using to park moves the vehicle away from the operator. However, it can be difficult for the operator to judge the distance from the vehicle to know when their remote device is close enough to the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for mobile device tethering for remote parking assist. An example vehicle includes ultra-wide angle cameras and a processor coupled to memory. The processor generates an interface based on a location of the mobile device including an overhead representation of the vehicle generated using images from the cameras and representations of a position of a mobile device and a boundary around the vehicle. The processor also sends the interface to the mobile device, and when the mobile device is not within the boundary, prevents autonomous parking of the vehicle.

An example method includes generating an interface based on a location of the mobile device including an overhead representation of the vehicle generated using images from ultra-wide angle cameras positions on the vehicle and representations of a position of a mobile device and a boundary around the vehicle. The example method also includes sending, via a wireless module, the interface to the mobile device. Additionally, the method includes, when the mobile device is not within the boundary, preventing autonomous parking of the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
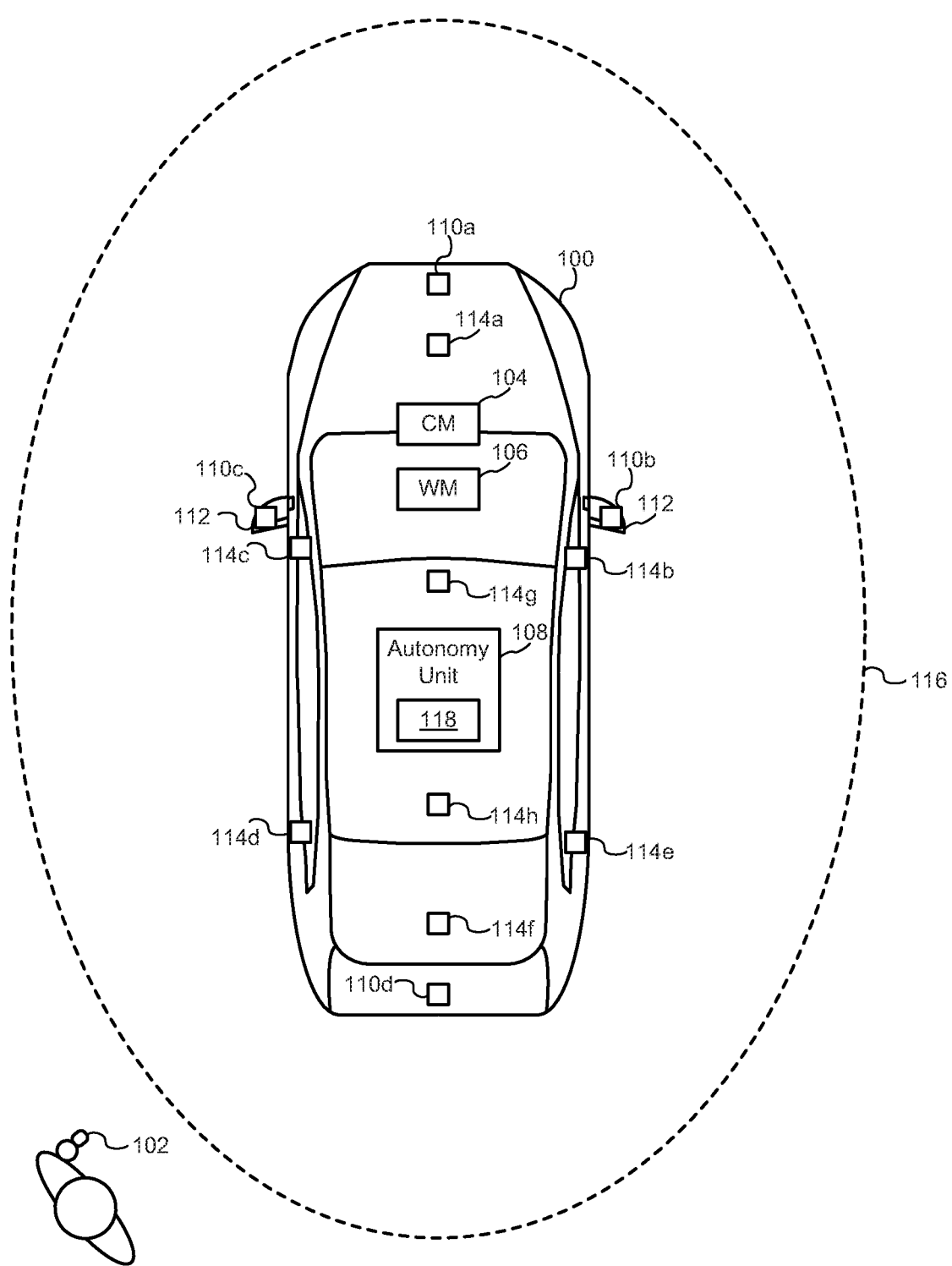
FIG. 1 illustrates a vehicle and a mobile device operating in accordance with this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Remote park assist (RePA) systems are designed to autonomously park and un-park vehicles when the operator is outside the vehicle. For example, RePA systems may be used when a parking spot is too narrow for the operator to open the door, or passengers to open their doors, when the vehicle is parked. RePA systems use range detection sensors (e.g., ultrasonic sensors, radar, LiDAR, cameras, etc.) to sense the environment around the parking spot and plan and execute a path into and out of the parking spot. In some examples, the RePA system is activated by the operator and scans for an available parking space. When a parking space is detected, the RePA system signals, via an interface (e.g., a center console display, etc.) for the operator to stop the vehicle near the detected parking spot. The operator then exits the vehicle. RePA systems are further activated via mobile devices (e.g., smartphone, smart watch, key fob, etc.) to complete the autonomous parking. In jurisdictions that require the mobile device to stay within a threshold distance of a vehicle, the RePA system tracks the location of the mobile device in relation to the location of the vehicle and determines whether the mobile device is within the threshold distance. When the mobile device is outside the threshold distance from the vehicle, the RePA system will not autonomously move the vehicle.

The RePA system of the vehicle tracks the location of a mobile device (e.g., a smart phone, a smart watch, a key fob, etc.) associated with the operator relative to the location of the vehicle. The RePA system may use various techniques to determine the location of the mobile device relative to the location of the vehicle, such as dead reckoning and signal triangulation. Mobile device dead reckoning uses the inertial sensors (e.g., accelerometers, gyroscopes, etc.) in the mobile device to determine the current location of the mobile device based on a previous location (sometimes referred to as a "fix"). As the mobile device moves, the RePA system tracks the movement by tracking the distance and direction the mobile device has traveled relative to the initial location. To perform mobile device dead reckoning, the RePA system determines the initial location by establishing the location of the mobile device in relation to the location of the vehicle. However, establishing that relationship can be difficult. Additionally, dead reckoning is subject to cumulative error. Over time and distance, the error becomes large enough causing the location calculations to not be accurate enough for the RePA system. As a result, from time-to-time (e.g., after a threshold time, after a threshold distance, etc.), the RePA system reestablishes an initial location of the mobile device. For example, when an operator leaves the vehicle and goes shopping, to perform mobile device dead reckoning, the RePA system needs to reestablish the location of the mobile device relative to the location of the vehicle because of the cumulative error. One localization technique is to use the signal strength(s) of signals between the antenna of the mobile device and antenna(s) of the vehicle. By using a measurement of the strength of the signals (e.g., a received signal strength indicator (RSSI), a transmission strength (RX) a received channel power indicator (RCPI), etc.), the RePA system can estimate a location of the mobile device. The accuracy of the estimation depends on several factors, such as how many signal strength measurements from different vehicle antennas are being used, the frequency of the signal, the distance between the antenna of the mobile device and the antenna(s) of the vehicle, and interference of the environment around the vehicle, etc. In addition to mobile device dead reckoning, the RePA system performs vehicular dead reckoning. Since the vehicle moves during a RePA event, the system must estimate the real-time location of the vehicle to properly compare it with the estimated location of the mobile device. For example, even if the mobile device is stationary during the RePA event, the distance between the mobile device and vehicle will change as a result of the movement of the vehicle. Vehicular dead reckoning can be performed using the transducers already resident to typical vehicles, such as the steering wheel angle sensor and rotary encoders that are used for odometry. The vehicle can also perform dead reckoning using similar methods to mobile device dead reckoning (e.g. accelerometers, gyroscopes, etc.), but the vehicle-specific hardware is likely to produce more accurate results. As discussed below, the RePA system of the present disclosure uses dead reckoning and localization, singly and in combination, with various techniques to overcome the errors in the location determination methods and determine whether the mobile device is within a threshold distance of the vehicle.

As discussed below, the RePA system of the vehicle communicatively couples to the mobile device and provides interface elements to an application executing on the mobile device. These interface elements facilitate informing the operator of the state of the RePA system, such as (a) a location of a virtual boundary that defines the maximum distance at which the RePA system may be operated, (b) the location of the mobile device relative to the vehicle and/or the virtual boundary, and/or (c) the planned travel path of the vehicle, etc. Additionally, the vehicle provides warnings and/or status indicators to facilitate informing the operator of whether the operator should change position relative to the vehicle so that the RePA system can still autonomously operate the vehicle. In some examples, the warnings and/or status indicators are text, visual (e.g., color changes, operative interface changes, etc.), audible, and/or haptic. For example, interface elements may be augmented to be green, yellow, or red depending on the relationship between the location of the mobile device and the virtual boundary. The mobile device displays the interface elements. In some examples, the RePA system also sends images from a 360 degree camera system to be displayed on the mobile device.

FIG. 1 illustrates a vehicle 100 and a mobile device 102 operating in accordance with this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 is a semi-autonomous vehicle (e.g., some routine motive functions, such as parking, are controlled by the vehicle 100), or an autonomous vehicle (e.g., motive functions are controlled by the vehicle 100 without direct driver input). In the illustrated example the vehicle 100 includes a camera module (CM) 104, a wireless module (WM) 106, and an autonomy unit 108.

The camera module 104 receives images from cameras 110a-110d to generate a 360 degree camera video image. The cameras 110a-110d are ultra-wide fish-eye cameras that capture images of the area around the vehicle 100. The cameras 110a-110d are located on each side of the vehicle 100. In the illustrated example, the cameras 110a-110d are located on the front of the vehicle 100 (e.g., near a badge of the vehicle 100), the rear of the vehicle 100, and on the side-view mirrors 112 of the vehicle 100. The camera module 104 receives images from the cameras 110a-110d and merges the images together with a representation of the vehicle 100 to form the video image to provide a simulated top-down view of the area adjacent to the vehicle 100.

The wireless module 106 is communicatively coupled (e.g., wired or wirelessly) to wireless nodes 114a-114h located at various locations of the vehicle 100. The wireless module 106 performs localization techniques (e.g., triangulation/trilateration, and/or dead reckoning, etc.) based on signal strength values (e.g., a received signal strength indicator (RSSI), a transmission strength (RX), a received channel power indicator (RCPI), etc.) received from the wireless nodes 114a-114h to determine the location of the mobile device 102 relative to the location of the vehicle 100. The wireless module 106 provides this localization data to other electronic control modules in the vehicle 100, such as the autonomy unit 108.

In the illustrated example, each of the wireless nodes 114a-114h is configured to communicatively couple to the mobile device 102 of the operator. Each of the wireless nodes 114a-114h includes hardware and firmware to establish a wireless connection with a key fob and/or a mobile device (e.g., the mobile device 102). For example, the wireless nodes 114a-114h are wireless personal area network (WPAN) modules that wirelessly communicate with key fob(s) and/or mobile device(s) (e.g., the mobile device 102) via short-range wireless communication protocol(s). In some examples, the wireless nodes 114a-114h implement the Bluetooth® and/or Bluetooth® Low Energy (BLE®) protocols. The Bluetooth® and BLE® protocols are set forth in Volume 6 of the Bluetooth® Specification 4.0 (and subsequent revisions) maintained by the Bluetooth® Special Interest Group. Additionally or alternatively, the wireless nodes 114a-114h are configured to wirelessly communicate via Wi-Fi®, Near Field Communication (NFC), UWB (Ultra-Wide Band), and/or any other short-range and/or local wireless communication protocol (e.g., IEEE 802.11 a/b/g/n/ac/p) that enables each of the wireless nodes 114a-114h to communicatively couple to the mobile device 102.

Some of the wireless nodes 114a-114f are exterior nodes. The exterior nodes are positioned and oriented to communicatively couple to and/or monitor communication of the mobile device 102 and/or a key fob when the mobile device 102 and/or the key fob is located outside of and/or within the cabin of the vehicle 100. For example, each of the wireless nodes 114a-114f is located near an exterior of the vehicle 100 and oriented in a direction away from the cabin to communicatively couple to the mobile device 102 when the mobile device 102 is outside of the cabin of the vehicle 100. Some of the wireless nodes 114g and 114h are interior nodes. The interior nodes are positioned and oriented to communicatively couple to and/or monitor communication of the mobile device 102 and/or a key fob when the mobile device 102 and/or the key fob is located within and/or outside of the cabin of the vehicle 100. For example, the one of the wireless nodes 114g may be located near and oriented toward a front portion of the cabin to communicatively couple to and/or monitor communication of the mobile device 102 and/or a key fob when the mobile device 102 and/or the key fob is located within the front portion of the cabin. Further, the wireless nodes 114h may be located near and oriented toward a rear portion of the cabin to communicatively couple to and/or monitor communication of the mobile device 102 and/or a key fob when the mobile device 102 and/or the key fob is located within the rear portion of the cabin.

The autonomy unit 108 communicates with various electronic control units (ECUs) (e.g., a powertrain control unit, a body control unit, a brake control unit, etc.) and/or various sensors (e.g., ultrasonic sensors, radar, LiDAR, cameras, etc.) to autonomously control motive functions of the vehicle 100. The autonomy unit 108 includes a RePA system that, when engaged, autonomously parks the vehicle 100 as long as the conditions are met for operation. One condition is that the mobile device 102 is to be within a virtual boundary 116 defined by a threshold distance from the surface of the vehicle 100. Another condition is that the autonomy unit 108 receives, via the wireless module 106, a continuous input signal from the mobile device 102 that is generated while the operator is providing an input into the mobile device 102. Examples of methods of monitoring continuous input from the mobile device 102 are described in U.S. patent application Ser. No. 15/711,741, entitled "Mobile Device Initiation of Vehicle Remote-Parking," filed Sep. 21, 2017, and U.S. patent application Ser. No. 15/861,348, entitled "Mobile Device Interface for Trailer Backup-Assist," filed Jan. 3, 2018, which are herein incorporated by reference in their entirety.

The autonomy unit 108 determines whether the mobile device 102 is within the virtual boundary 116 based on the localization data provided by the wireless module 106. In some examples, the autonomy unit 108 provides, via the body control module, visual indicators to inform the operator of the relationship between the location of the mobile device 102 and the location of the virtual boundary 116. For example, the autonomy unit may change the color, illumination pattern, and/or the brightness of lights of the vehicle 100. Examples of providing a visual indicator on the vehicle are described in U.S. patent application Ser. No. 15/860,242, entitled "Mobile Device Tethering for a Remote Parking Assist System of a Vehicle," filed Jan. 2, 2018, which is herein incorporated by reference in its entirety.

In the illustrated example, the autonomy unit 108 includes an interface controller 118. The interface controller 118 controls which interface elements are displayed on the mobile device 102, the characteristics of the interface elements, and sends instructions to the mobile device 102 that causes the selected interface elements to appear on a display of the mobile device 102. The interface controller 118 receives the localization data via the wireless module 106, determines the relationship between the location of the mobile device 102 and the location of the virtual boundary 116, generates interface elements, and sends the interface elements to the mobile device 102 via the wireless module 106. The interface controller 118 determines the mobile device 102 is either (a) within the virtual boundary 116, (b) outside of the virtual boundary 116, or (c) within, but near, the virtual boundary 116. In some examples, the interface controller 118 also sends the 360 degree camera video image generated by the camera module 104. As used herein, near the virtual boundary 116 refers to a specific distance set by the interface controller 118 from an edge of the virtual boundary 116. For example, "being near the virtual boundary 116" may be 0.5 meters from the edge of the virtual boundary 116. As another example, "being near the virtual boundary 116" may be defined as being 90% of the threshold distance that establishes the virtual boundary 116 from the vehicle 100. In such an example, if the virtual boundary 116 is defined at 6 meters from the vehicle 100, being near the virtual boundary 116 may be when the mobile device 102 is between 5.4 meters to 6 meters from the vehicle 100. Example interface elements are described in connection with FIGS. 2, 3A, 3B, 3C, and 4 below. Additionally, in some examples, the interface controller 118 sends commands to the mobile device 102 to cause audible and/or haptic alerts to be presented the operator.

In some examples, the interface controller 118 sends instructions to the mobile device 102 to produce a haptic alert to the operator. The interface controller 118 provides a vibration pattern with a configurable pulse interval when (a) the operator is holding the mobile device, (b) the mobile device is within a threshold distance of the vehicle (e.g., 1.5 times the distance that defines the virtual boundary 116), (c) the operator is providing continuous input (e.g., the continuous input signal is being received from the mobile device 102), and/or the vehicle 100 is below a speed threshold (e.g., 3.2 kilometers per hour, etc.). In some examples, the pulse interval is a function of the distance of the mobile device 102 from the vehicle 100. For example, the interface controller 118 may cause the pulses to become more frequent as the mobile device 102 approaches the virtual boundary 116. In some examples, in response to the mobile device 102 transitioning to being outside the virtual boundary 116, the instructions from the interface controller 118 cause mobile device 102 to continuously vibrate. Alternatively, in some examples, the interface controller 118 sends the state of the vehicle 100 (e.g., speed, direction of travel, etc.) to the mobile device 102. In such examples, the mobile device 102 uses the state of the vehicle 100 to determine the audible, visual and/or haptic alerts and the intervals associated with the haptic alerts.

In some examples, the interface controller 118 sends instructions to the mobile device 102 to produce an audible alert to the operator. The interface controller 118 provides an audio signal with a configurable pitch and/or tone when (a) the operator is holding the mobile device, (b) the mobile device is within a threshold distance of the vehicle (e.g., 1.5 times the distance that defines the virtual boundary 116), (c) the operator is providing continuous input (e.g., the continuous input signal is being received from the mobile device 102), and/or the vehicle 100 is below a speed threshold (e.g., 3.2 kilometers per hour, etc.). In some examples, the pitch and/or tone is a function of the distance of the mobile device 102 from the vehicle 100. For example, the interface controller 118 may cause the pitch and/or tone to increase as the mobile device 102 approaches the virtual boundary 116. In some examples, in response to the mobile device 102 transitioning to being outside the virtual boundary 116, the instructions from the interface controller 118 cause mobile device 102 to provide the pitch and/or tone act a predefine interval.

The mobile device 102 includes hardware and software to communicatively couple to the wireless nodes 114a-114h of the vehicle 100, execute applications, and display an interface to the operator. The mobile device 102 provides input device(s) (e.g., a physical button, a virtual button via a touch screen, a motion track on the touch screen, etc.). Additionally, the mobile device 102 includes (i) inertial sensors to provide movement information of the mobile device 102, (ii) a speaker, headphone jack, and/or personal area network module coupleable to wireless headphones, and (iii) a vibration motor to provide haptic feedback to the operator.

Figure 2:
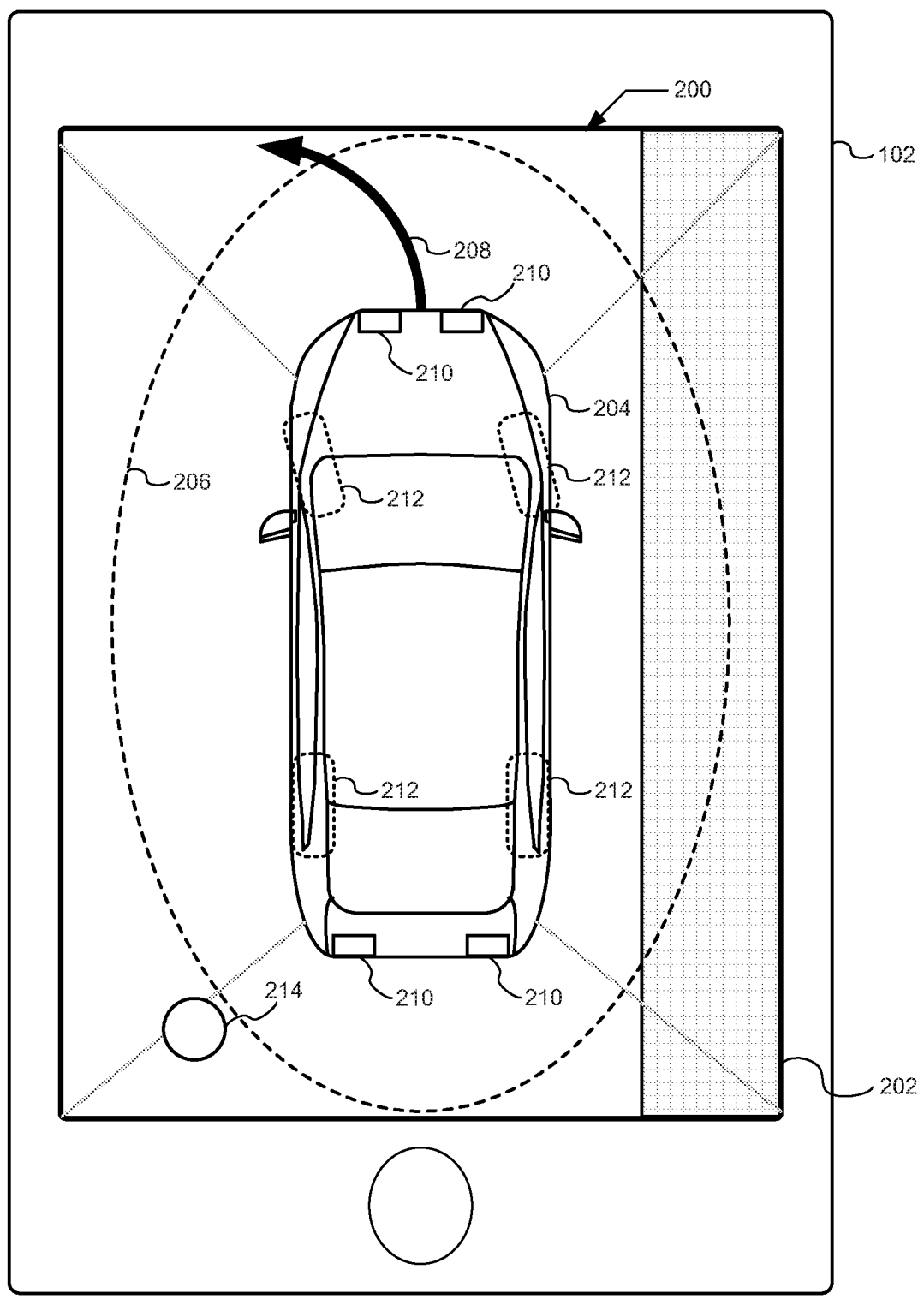
FIG. 2 illustrates an interface on the mobile device.

FIG. 2 illustrates an example interface 200 on the mobile device 102. Based on the localization data provided by the wireless module 106, the interface controller 118 generates the interface 200 and sends the interface 200 to the mobile device 102. The interface controller 118 periodically generates (e.g., every 500 milliseconds, every second, etc.) the interface 200 and sends the updated interface 200 to the mobile device 102. In some examples, the interface controller 118 sends the interface 200 to be displayed on the mobile device 102 when (a) the mobile device 102 is a threshold distance from the vehicle 100 (e.g., halfway between the vehicle 100 and the virtual boundary 116, etc.), (b) the vehicle 100 is autonomously moving below a speed threshold, (c) the continuous input signal is not received from the mobile device 102, (d) when the vehicle 100 detects objects (e.g., via radar, LiDAR, ultra-sonic sensors, etc.) around the vehicle 100 that are within a threshold distance from the vehicle 100, (e) the interface controller 118 determines that the available display region of the mobile device 102 is large enough to accommodate the interface 200, and/or (f) the RePA system in engaged.

In the illustrated example, the interface 200 includes (a) a 360 degree image 202 generated by the camera module 104 with a representation 204 of the vehicle 100, (b) a representation 206 of the virtual boundary 116, (c) a representation 208 of the planned path that the vehicle will execute to autonomously park, (d) a representation 210 of a state of the lights of the vehicle 100, and (e) a representation 212 of the positions of the wheels of the vehicle 100. Additionally, in some examples, the interface 200 includes a representation 214 of the location of the mobile device 102 and/or a zone of probability (e.g., an area that represents probable locations of the mobile device 102 accounting for localization errors) as determined by the wireless module 106. In some examples, the interface 200 includes indications of the direction of travel of the vehicle 100, the angle of the road, and/or other elements to assist the operator interpret the orientation of the vehicle 100. In some examples, the representation 206 of the virtual boundary 116 is color coded to indicate whether the mobile device 102 (a) is outside the virtual boundary 116 (e.g. color coded red), (b) is inside the virtual boundary 116 but near (e.g., within 0.5 meters, etc.) the edge of the virtual boundary 116 (e.g., color coded yellow), or (c) is inside the virtual boundary 116 (e.g., color coded green). Alternatively or additionally, in some examples, the representation 206 of the virtual boundary 116 may be animated to indicate the relationship of the location of the mobile device 102 to the location of the vehicle 100.

Figure 3C:
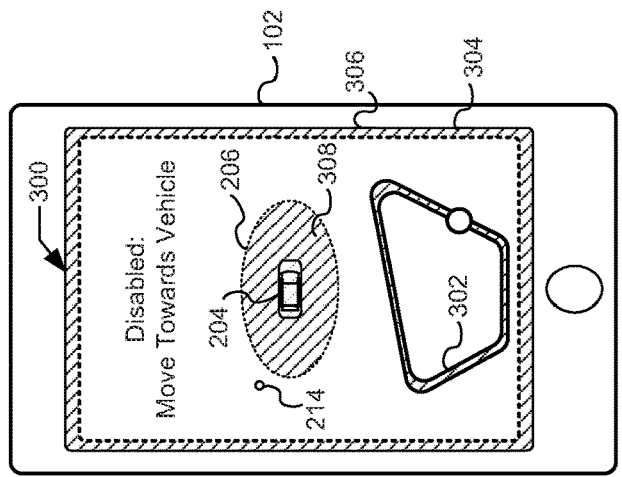
FIGS. 3A, 3B, and 3C illustrate another interface on the mobile device of FIG. 1.
Figure 3B:
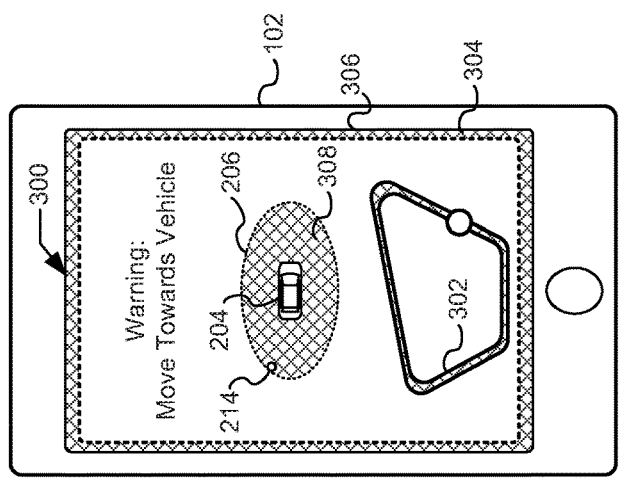
Figure 3A:
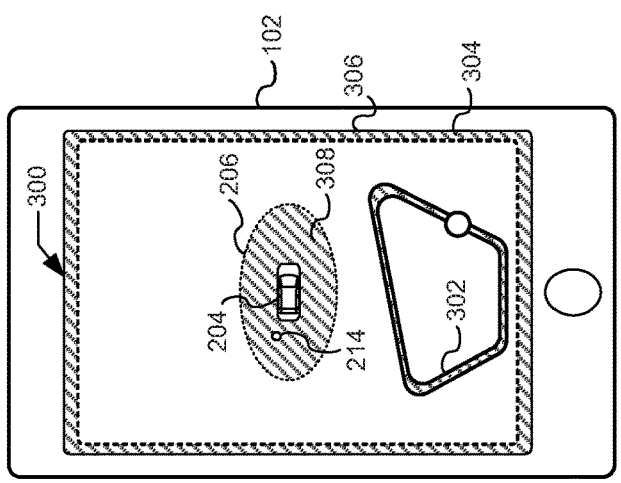

FIGS. 3A, 3B, and 3C illustrate another interface 300 on the mobile device 192 of FIG. 1. In some examples, the interface controller 118 generates the interface 300, when, for example, the available display region of the mobile device 102 is not large enough to accommodate the interface 200 of FIG. 2. In the illustrated examples, the interface 300 includes (a) an motion track 302, (b) the representation 204 of the vehicle 100, (c) the representation 206 of the virtual boundary 116, (d) the representation 214 of the estimated location of the mobile device 102, and (e) a border indicator 304. The motion track 302 provides an input for the operator to trace with his or her finger via a touch screen of the mobile device 102 to initiate and terminate remote parking of a vehicle 100 and/or provide a continuous input signal. For example, the mobile device 102 sends the continuous input signal to the vehicle 100 as long as the operator is continually tracing a path defined by the motion track 302. In such a manner, the autonomy unit 108 causes the vehicle 100 to move during remote parking only when the user is moving his or her finger (e.g., thumb), conductive stylus, and/or prosthetic digit along the motion track 302. The motion track 302 may be any continuous shape (e.g., non-circular, non-elliptical, wavy, obtuse, etc.) that reflects a natural motion or hand-movement of the user to facilitate the user in easily tracing the motion track 302 that initiates remote parking of the vehicle 100. The border indicator 304 is a region following an edge 306 of the screen of the mobile device 102 that is a number of pixels (e.g., 10 pixels, 20 pixel) wide.

In the illustrated examples, the motion track 302, the border indicator 304, and/or an interior portion 308 defined by the representation 206 of the virtual boundary 116 are color coded to indicate the relationship of the location of the mobile device 102 to the location of the vehicle 100. The color coding facilitates the operator understanding whether the mobile device 102 is within the virtual boundary 116 with a glance of the screen. Alternatively or additionally, in some examples, the interface controller 118 causes the interface 300 to have other visual indicators, such as blinking or animation, to communicate the status to the RePA system. For example, when the vehicle 100 is in motion, the border indicator 304 may be animated to rotate in a direction indicative of the direction of travel (e.g., forward or reverse) of the vehicle 100. In FIG. 3A, the interface 300 depicts the representation 214 of the mobile device 102 within the representation 206 of the virtual boundary 116. In such an example, the motion track 302, the border indicator 304, and/or the interior portion 308 defined by the representation 206 of the virtual boundary 116 may be color coded green. In FIG. 3B, the interface 300 depicts the representation 214 of the mobile device 102 within the representation 206 of the virtual boundary 116 and near the edge of the virtual boundary 116. In such an example, the motion track 302, the border indicator 304, and/or the interior portion 308 defined by the representation 206 of the virtual boundary 116 may be color coded yellow. In FIG. 3C, the interface 300 depicts the representation 214 of the mobile device 102 outside the representation 206 of the virtual boundary 116. In such an example, the motion track 302, the border indicator 304, and/or the interior portion 308 defined by the representation 206 of the virtual boundary 116 may be color coded red.

Figure 4:
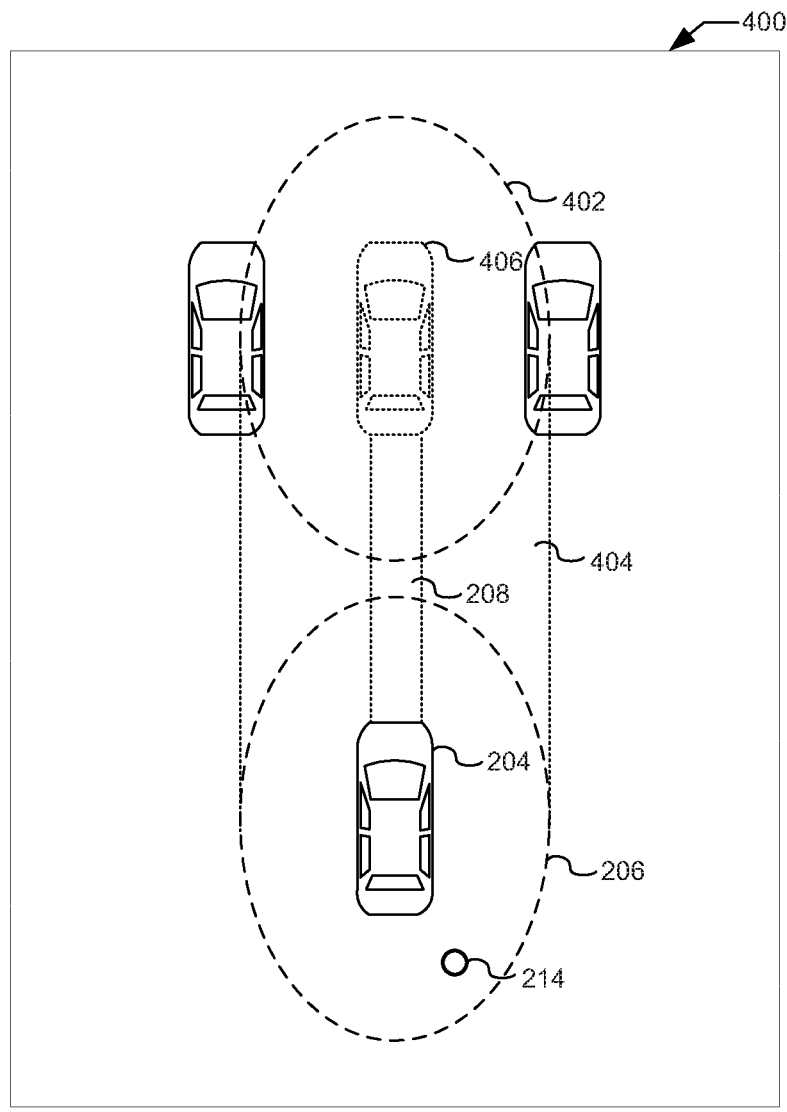
FIG. 4 illustrates another interface on the mobile device of FIG. 1.

FIG. 4 illustrates another interface 400 that the interface controller 118 may cause to be displayed on the mobile device 102 of FIG. 1. In the illustrated example, the interface 400 includes (a) the representation 204 of the vehicle 100, (b) the representation 206 of the virtual boundary 116, (c) the representation 214 of the estimated location of the mobile device 102, (d) the representation 208 of the planned path that the vehicle will execute to autonomously park, (e) a representation 402 of an estimated final location of the virtual boundary 116, (f) a representation 404 of an area in which the virtual boundary 116 will exist during the virtual parking maneuver, (g) representation(s) of objects near the path of the vehicle 100, and/or (h) a representation 406 of an estimated final location of the vehicle 100. In some examples, the interface 400 animates the representation 204 of the vehicle 100 to show movement along the path to the final location of the vehicle 100. Additionally, in some examples, the interface 400 includes the video images from the 360 degree camera system to show the area around the vehicle 100. In such examples, as the vehicle 100 moves, the video images from the 360 degree camera system shift on the interface 400 to provide a current view of the area around the vehicle 100 as the vehicle 100 moves.

Figure 5:
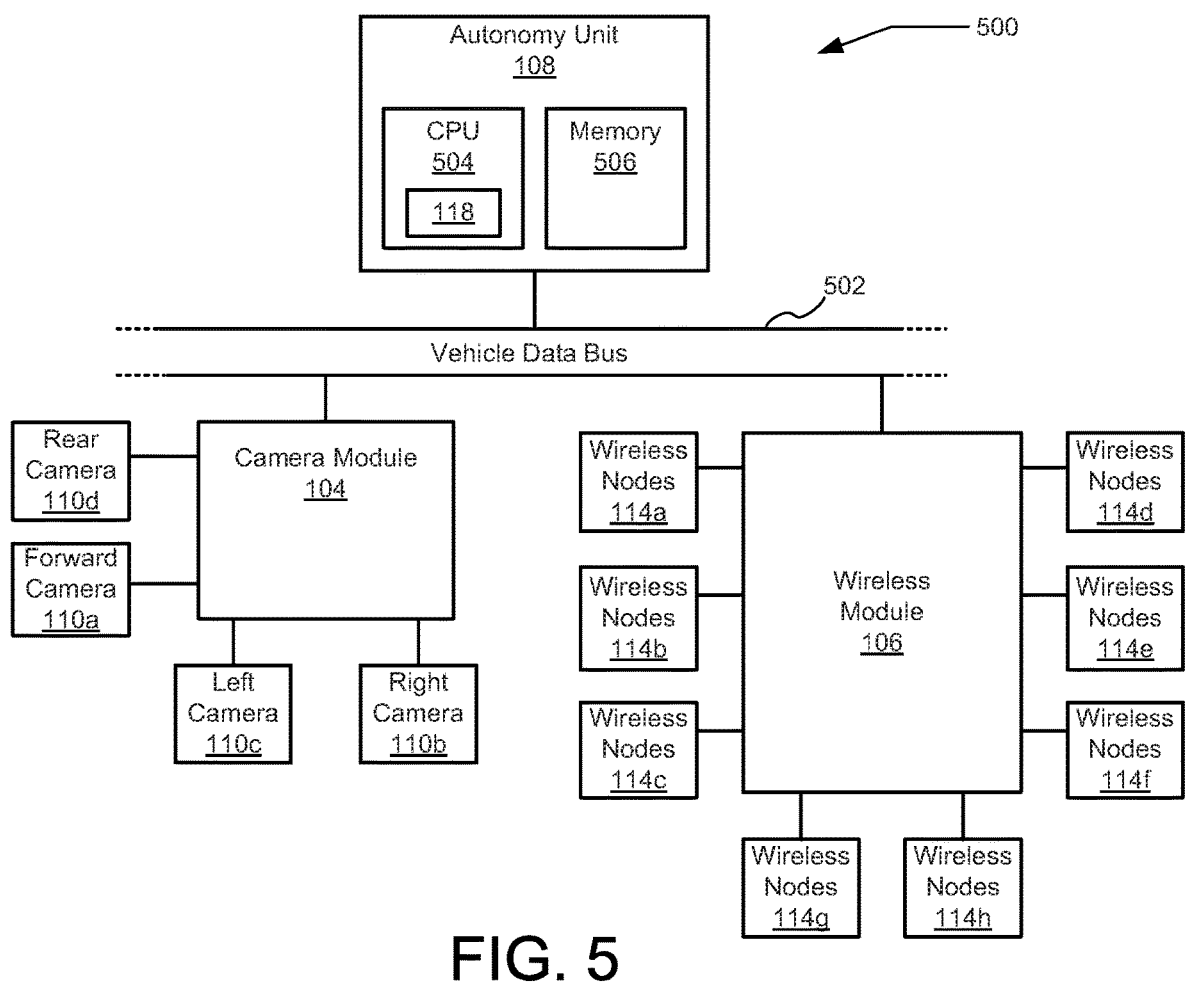
FIG. 5 is a block diagram of electronic components of the vehicle of FIG. 1.

FIG. 5 is a block diagram of electronic components 500 of the vehicle 100 of FIG. 1. In the illustrate example, the electronic components 500 include the camera module 104, the wireless module 106, the autonomy unit 108, the cameras 110a-110d, the wireless nodes 114a-114h, and a vehicle data bus 502.

In the illustrated example, the autonomy unit 108 includes a processor or controller 504 and memory 506. In the illustrated example, the autonomy unit 108 is structured to include interface controller 118. Alternatively, in some examples, the interface controller 118 is incorporated into another electronic control unit (ECU) with its own processor and memory. The processor or controller 504 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 506 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 506 includes multiple kinds of memory, particularly volatile memory and non-volatile memory.

The memory 506 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 506, the computer readable medium, and/or within the processor 504 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 502 communicatively couples the camera module 104, the wireless module 106, and the autonomy unit 108. In some examples, the vehicle data bus 502 includes one or more data buses. The vehicle data bus 502 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 6:
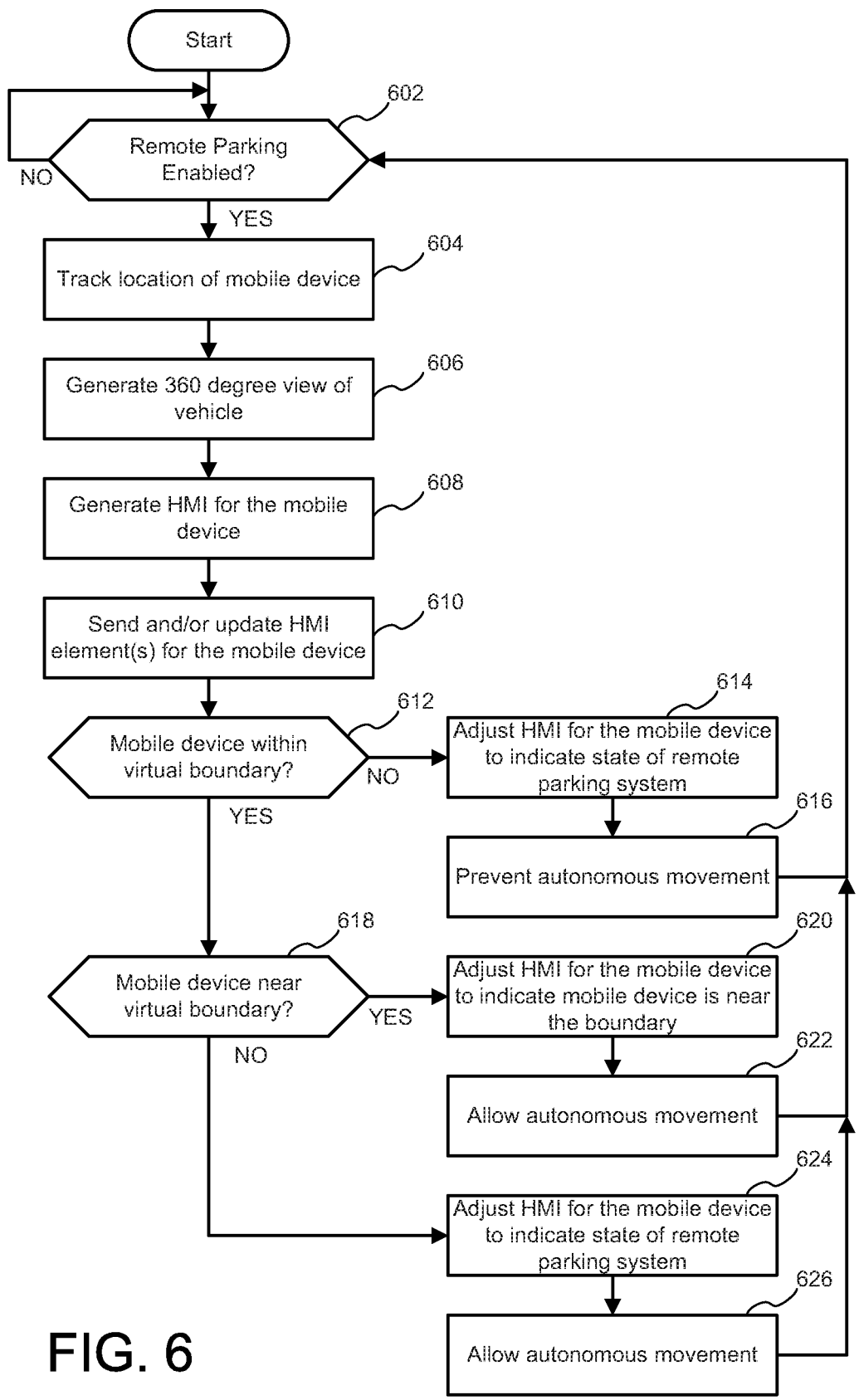
FIG. 6 is a flowchart of a method to assist an operator operating the remote park assist system of the vehicle of FIG. 1, which may be implemented by the electronic components of FIG. 5.

FIG. 6 is a flowchart of a method to assist an operator operating the remote park assist system of the vehicle 100 of FIG. 1, which may be implemented by the electronic components 500 of FIG. 5. Initially, at block 602, the interface controller 118 waits until the remote parking system is enabled. In some examples, the operator enables the remote parking system through an infotainment system (e.g., Sync® by Ford, etc.) on a center console display. For example, after stopping the vehicle 100 and before exiting the cabin of the vehicle 100, the operator may enable the remote parking assist system. Enabling the remote parking system causes the autonomy unit 108 to, for example, identify a potential parking spot and plan a path into the parking spot. At block 604, after the remote parking assist system has been enabled, the interface controller 118 tracks the location of the mobile device 102 using the localization data from the wireless module 106. At block 606, the camera module 104 generates the 360 degree composite image from the images received from the cameras 110a-110d. At block 608, the interface controller 118 generates an interface (e.g., the interface 200, 300, 400 of FIGS. 2, 3A, 3B, 3C, and 4 above, etc.) based on the location of mobile device 102 relative to the location of the vehicle 100. At block 610, the interface controller 118 sends instructions to the mobile device 102 that cause the mobile device 102 to display the interface generated at block 606.

At block 612, the interface controller 118 determines whether the mobile device 102 is within the virtual boundary 116 based on the localization data received at block 604. When the mobile device 102 is not within the virtual boundary 116, the method continues at block 614. Otherwise, when the mobile device 102 is with the virtual boundary 116, the method continues at block 618. At block 614, the interface controller 118 adjusts the interface for the mobile device 102 to indicate the state of the remote parking system. For example, the interface controller 118 may cause the border indicator 304 on the interface 300 to flash red. At block 616, the autonomy unit 108 prevents autonomous movement of the vehicle 100.

At block 618, the interface controller 118 determines whether the mobile device 102 is near (e.g., within 0.5 meters) the virtual boundary 116. When the mobile device 102 is near the virtual boundary 116, the method continues to block 620. Otherwise, when the mobile device 102 is not near the virtual boundary 116, the method continues to block 624. At block 620, the interface controller 118 adjusts the interface for the mobile device 102 to indicate the state of the remote parking system. For example, the interface controller 118 may cause the border indicator 304 on the interface 300 to turn yellow and generate a text-based warning. At block 622, the autonomy unit 108 allows autonomous movement of the vehicle 100.

At block 624, the interface controller 118 adjusts the interface for the mobile device 102 to indicate the state of the remote parking system. For example, the interface controller 118 may cause the border indicator 304 on the interface 300 to turn green. At block 626, the autonomy unit 108 allows autonomous movement of the vehicle 100.

The flowchart of FIG. 6 is representative of machine readable instructions stored in memory (such as the memory 506 of FIG. 5) that comprise one or more programs that, when executed by a processor (such as the processor 504 of FIG. 5), cause the vehicle 100 to implement the example interface controller 118 and/or, more generally, the example autonomy unit 108 of FIGS. 1 and 5. Further, although the example program(s) is/are described with reference to the flowchart illustrated in FIG. 6, many other methods of implementing the example interface controller 118 and/or, more generally, the example autonomy unit 108 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   ultra-wide angle cameras; and
   a processor coupled to memory to:
   generate an interface based on a location of a mobile device including an overhead representation of the vehicle generated using images from the cameras and representations of a position of the mobile device and a boundary around the vehicle;
   send the interface to the mobile device; and
   when the mobile device is not within the boundary, prevent autonomous parking of the vehicle.

2. The vehicle of claim 1, wherein the interface includes a border indicator that is displayed around a perimeter of a display of the mobile device.

3. The vehicle of claim 2, wherein the processor is to change characteristics of the border indicator based on the location of the mobile device compared to the location of the boundary.

4. The vehicle of claim 2, wherein the processor is to animate the border indicator based on a direction of travel of the vehicle.

5. The vehicle of claim 1, wherein the interface includes a representation of the vehicle, a planned path of the vehicle, and a representation of angles of tires of the vehicle.

6. The vehicle of claim 1, wherein the interface includes a motion track.

7. The vehicle of claim 6, wherein the processor is to change characteristics of the motion track based on the location of the mobile device compared to the location of the boundary.

8. The vehicle of claim 7, wherein the characteristics include at least one of a color or a blinking pattern.

9. The vehicle of claim 1, wherein the processor is to send instructions to the mobile device to cause the mobile device to vibrate.

10. The vehicle of claim 9, wherein the instructions cause the mobile device to vibrate at an interval based on a distance of the mobile device from the vehicle.

11. A method comprising:
    generating, with a processor, an interface based on a location of a mobile device including an overhead representation of a vehicle generated using images from ultra-wide angle cameras positions on the vehicle and representations of a position of the mobile device and a boundary around the vehicle;
    sending, via a wireless module, the interface to the mobile device; and
    when the mobile device is not within the boundary, preventing autonomous parking of the vehicle.

12. The method of claim 11, wherein the interface includes a border indicator that is displayed around a perimeter of a display of the mobile device.

13. The method of claim 12, including changing characteristics of the border indicator based on the location of the mobile device compared to the location of the boundary.

14. The method of claim 12, including animating the border indicator based on a direction of travel of the vehicle.

15. The method of claim 11, wherein the interface includes a representation of the vehicle, a planned path of the vehicle, and a representation of angles of tires of the vehicle.

16. The method of claim 11, wherein the interface includes a motion track.

17. The method of claim 16, including changing characteristics of the motion track based on the location of the mobile device compared to the location of the boundary.

18. The method of claim 17, wherein the characteristics include at least one of a color or a blinking pattern.

19. The method of claim 11, including sending instructions to the mobile device to cause the mobile device to vibrate.

20. The method of claim 19, wherein the instructions cause the mobile device to vibrate at an interval based on a distance of the mobile device from the vehicle.

* * * * *